United States Patent
Yamada et al.

(10) Patent No.: US 10,142,576 B2
(45) Date of Patent: Nov. 27, 2018

(54) CONTROL DEVICE, SOUND SWITCHING METHOD OF CONTROL DEVICE, AND PROGRAM

(75) Inventors: Eiju Yamada, Kanagawa (JP); Shin Ito, Tokyo (JP)

(73) Assignee: Saturn Licensing LLC, New York, NY (US)

( * ) Notice: Subject to any disclaimer, the term of this patent is extended or adjusted under 35 U.S.C. 154(b) by 518 days.

(21) Appl. No.: 13/357,863

(22) Filed: Jan. 25, 2012

(65) Prior Publication Data
US 2012/0201402 A1    Aug. 9, 2012

(30) Foreign Application Priority Data
Feb. 3, 2011 (JP) ................ P2011-022068

(51) Int. Cl.
| | |
|---|---|
| *H02B 1/00* | (2006.01) |
| *H04N 5/44* | (2011.01) |
| *H04N 5/45* | (2011.01) |
| *H04N 21/41* | (2011.01) |
| *H04N 21/422* | (2011.01) |
| *H04N 21/431* | (2011.01) |
| *H04N 21/439* | (2011.01) |
| *H04N 21/81* | (2011.01) |

(52) U.S. Cl.
CPC ............ *H04N 5/4403* (2013.01); *H04N 5/45* (2013.01); *H04N 21/4126* (2013.01); *H04N 21/42222* (2013.01); *H04N 21/439* (2013.01); *H04N 21/4316* (2013.01); *H04N 21/8106* (2013.01)

(58) Field of Classification Search
None
See application file for complete search history.

(56) References Cited

U.S. PATENT DOCUMENTS

| | | | |
|---|---|---|---|
| 2002/0186328 A1* | 12/2002 | Nishida et al. | ............... 348/738 |
| 2004/0055828 A1 | 3/2004 | Kavounas | |
| 2007/0124777 A1 | 5/2007 | Bennett et al. | |
| 2008/0077965 A1* | 3/2008 | Kamimaki | ............ H04N 7/163 725/105 |
| 2009/0288132 A1* | 11/2009 | Hegde | ........................... 725/141 |
| 2011/0115988 A1* | 5/2011 | Chang et al. | ................. 348/738 |
| 2011/0164175 A1* | 7/2011 | Chung et al. | ................. 348/468 |

FOREIGN PATENT DOCUMENTS

| | | |
|---|---|---|
| CN | 1976431 A | 6/2007 |
| CN | 101605230 A | 12/2009 |
| EP | 1762801 A1 | 3/2007 |
| EP | 2120224 A2 | 11/2009 |
| JP | 2001308809 A | 11/2001 |
| JP | 2006339856 A | 12/2006 |

(Continued)

OTHER PUBLICATIONS

Partial European Search Report from EP Application No. 12152407, dated Jan. 17, 2013.

(Continued)

*Primary Examiner* — James Mooney
(74) *Attorney, Agent, or Firm* — Lerner, David, Littenberg, Krumholz & Mentlik, LLP

(57) ABSTRACT

A control device may include a control unit to switch an output information to a predetermined output information, when a transition of contents of a controlled device is detected.

17 Claims, 10 Drawing Sheets

(56) References Cited

FOREIGN PATENT DOCUMENTS

| JP | 2007323014 A | 12/2007 |
|----|--------------|---------|
| JP | 2008160232 A | 7/2008  |
| JP | 2008166980 A | 7/2008  |
| JP | 2008167210 A | 7/2008  |
| JP | 2012165072 A | 8/2012  |

OTHER PUBLICATIONS

Office Action for Application No. 2011-022068, dated Sep. 22, 2014.
Office Action for Chinese Application No. 201210018823.8, dated Aug. 16, 2016.
European Search Report for Application No. 16188793.0, dated May 12, 2017.
Chinese Office Action for Application No. CN201210018823.8, dated Aug. 16, 2016.
Chinese Third Office Action for Application No. CN201210018823.8 dated Mar. 6, 2017.
Chinese Office Action for Application No. CN201210018823.8 dated Jan. 5, 2016.
European Communication for Application No. EP12152407.8 dated Jul. 11, 2016, 35 pages.
European Summons to attend oral proceedings for Application No. EP12152407.8 dated Jul. 7, 2015, 5 pages.
European Summons to attend oral proceedings for Application No. EP12152407.8 dated Mar. 16, 2016, 1 page.
European Communication for Application No. EP12152407.8 dated Nov. 10, 2014.

* cited by examiner

FIG.5
ST51
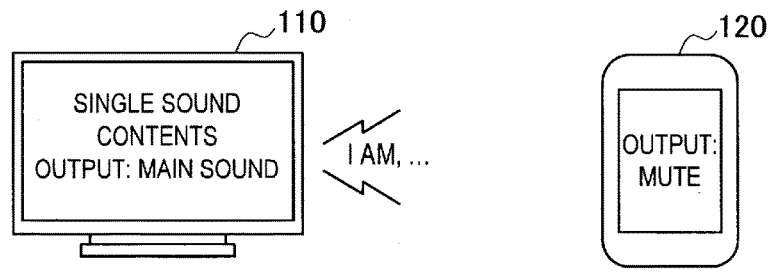
ST52
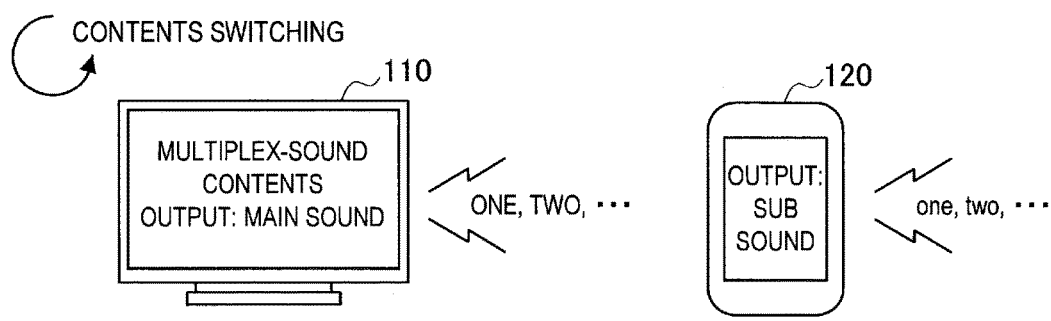
ST53
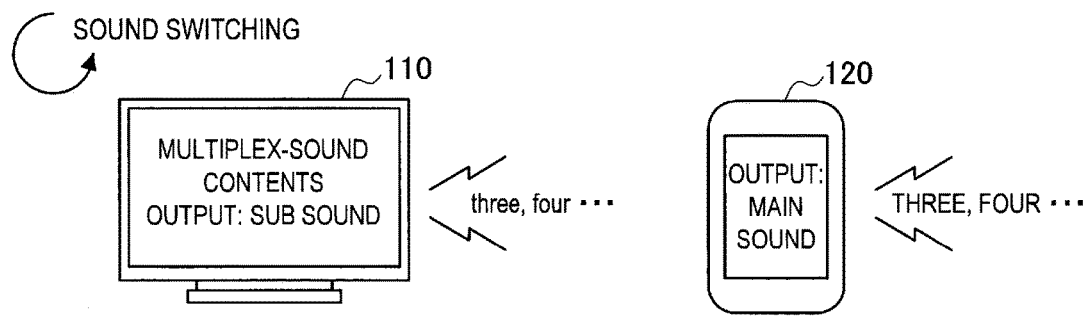
ST54
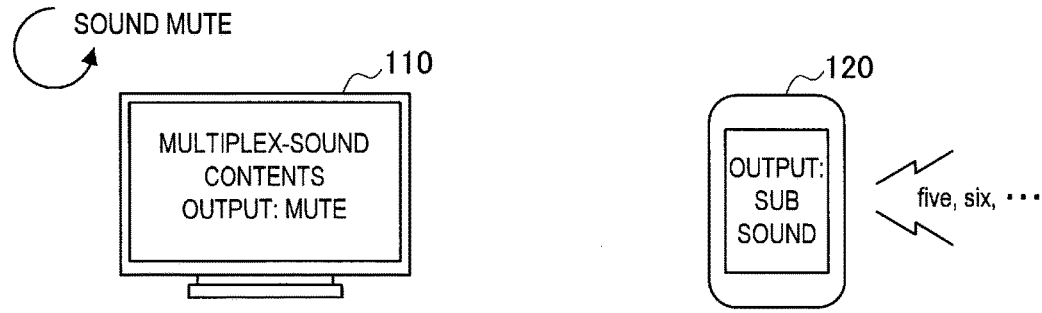

FIG.7
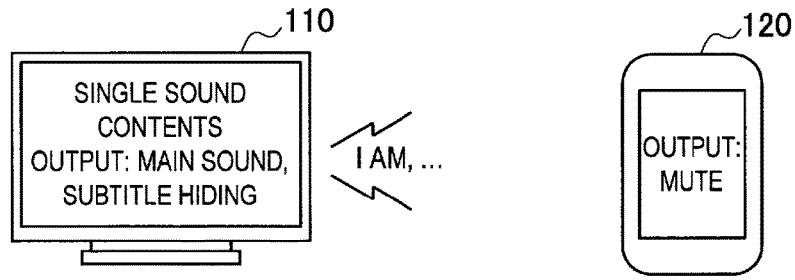
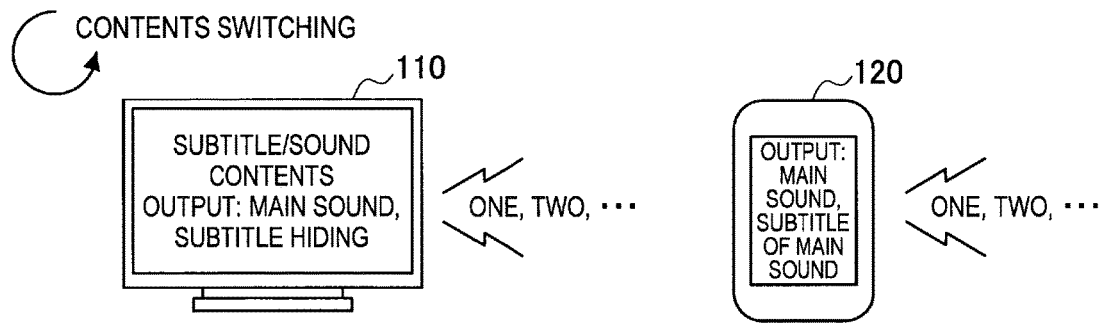
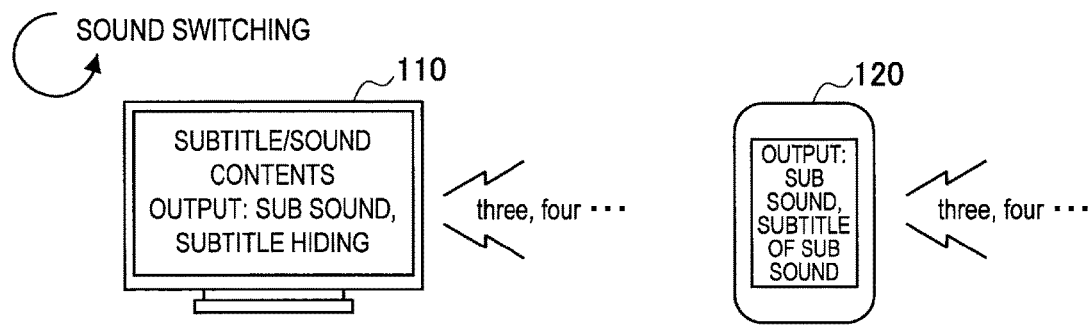
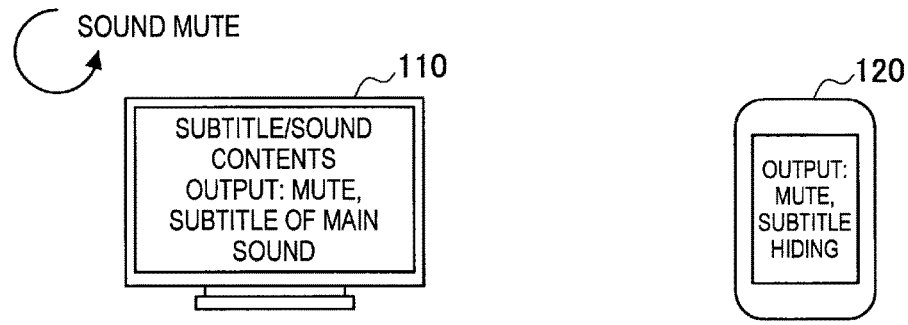

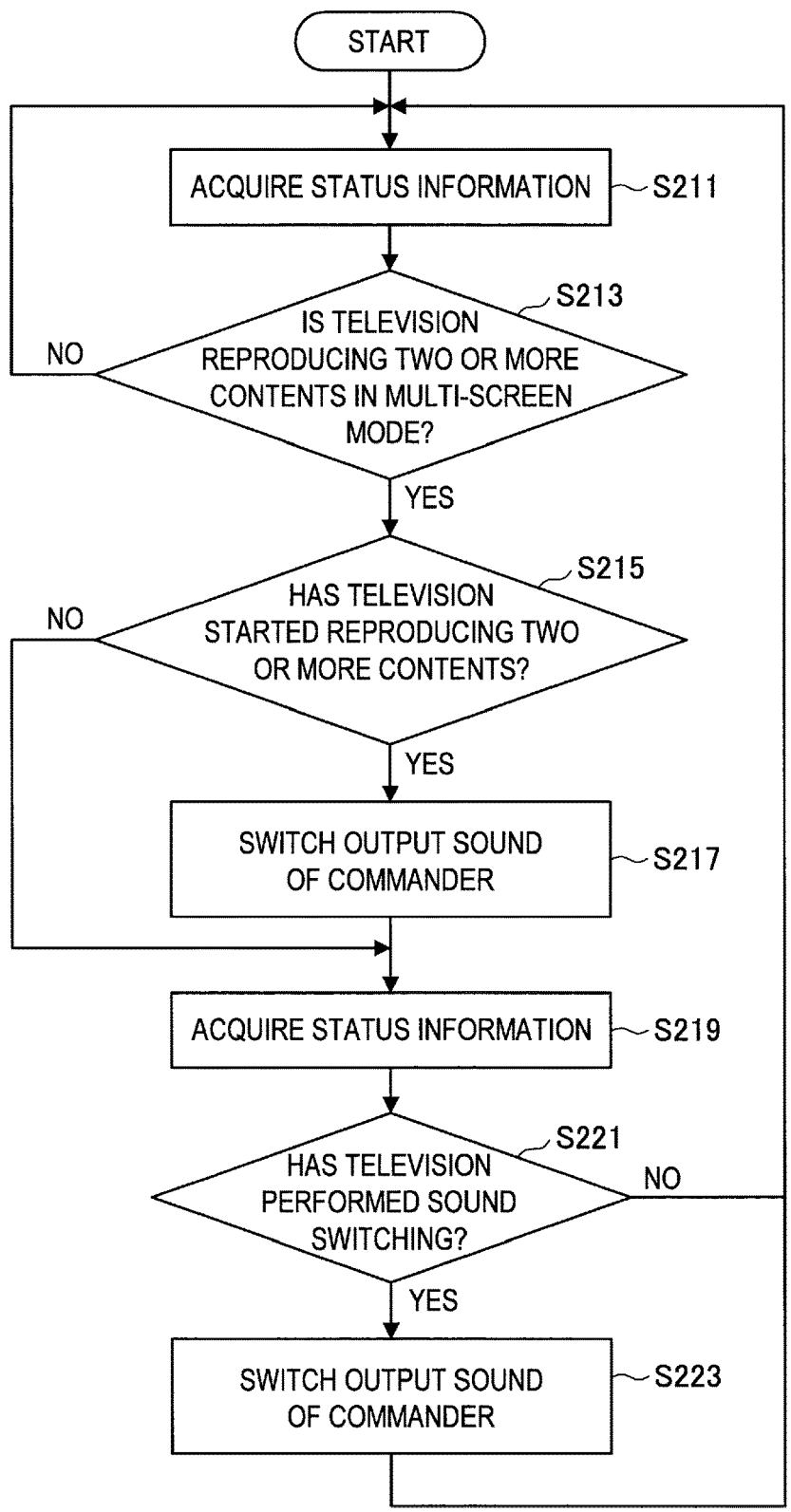

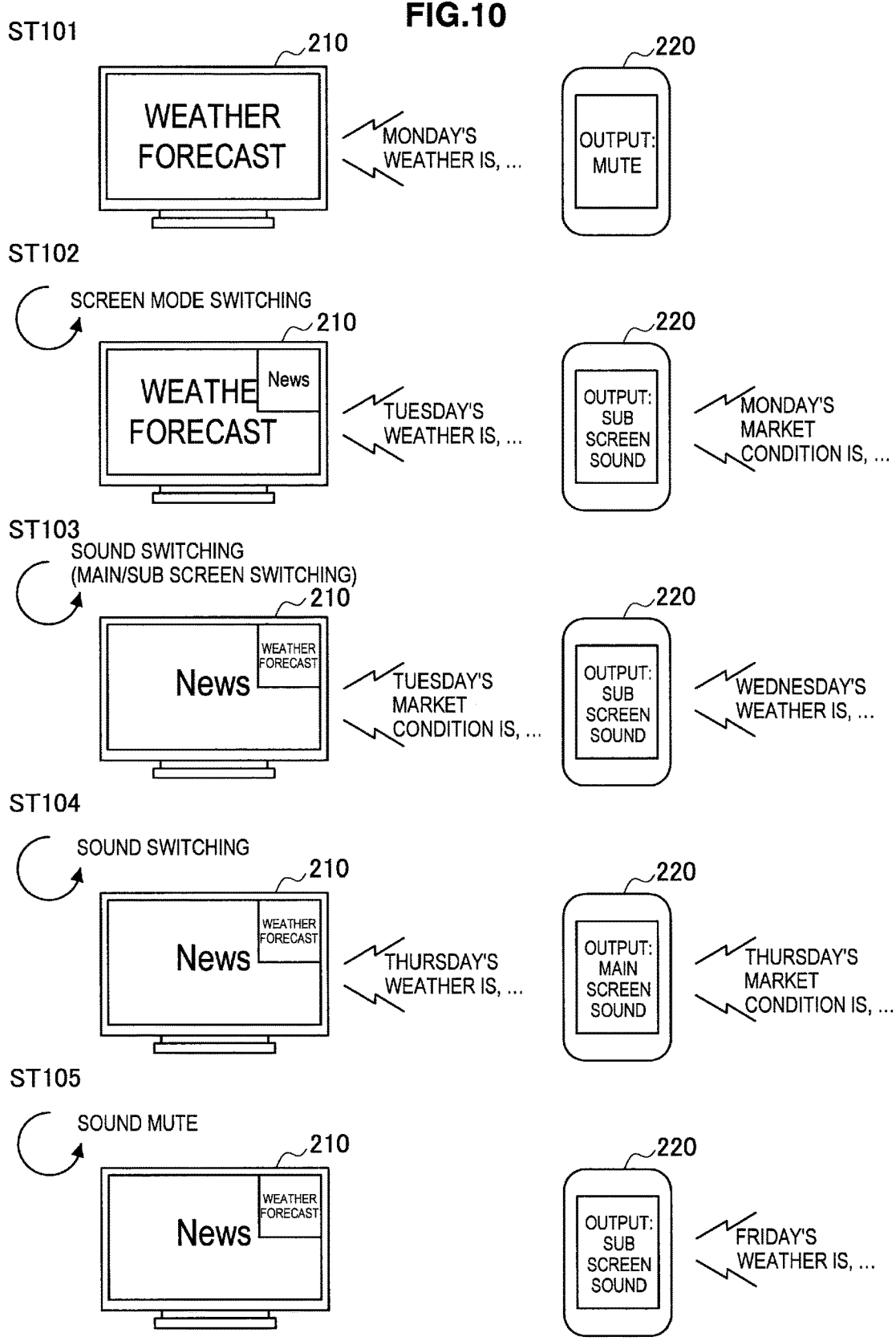

CONTROL DEVICE, SOUND SWITCHING METHOD OF CONTROL DEVICE, AND PROGRAM

CROSS-REFERENCE TO RELATED APPLICATIONS

This application claims priority from Japanese Patent Application No. 2011-022068 filed in the Japan Patent Office on Feb. 3, 2011, the entire content of which is hereby incorporated by reference.

BACKGROUND

The present disclosure relates to a control device, a sound switching method of a control device, and a program.

A cooperative system including a controlled device such as a television or a recorder and a control device such as a commander for controlling the controlled device has been known. In the cooperative system, a cooperation process, for example, for reproducing contents that are related to each other is sometimes performed between the controlled device and the control device.

Meanwhile, the controlled device sometimes operates in a state in which two or more types of sounds are switchable. This is the case of reproducing a single content including data of the main sound and a sub sound or the case of simultaneously reproducing two contents as the main screen and a sub screen. In such a case, the controlled device typically outputs any one of the main sound and the sub sound or outputs any one of the sound of the main screen content and the sound of the sub screen content.

Of course, the controlled device can simultaneously output the main sound and the sub sound or can simultaneously output the sound of the main screen content and the sound of the sub screen content. However, in such a case, two or more types of sounds may be mixed, and it may be difficult to listen to the desired sound. Meanwhile, for example, when plural users watch one or more of the contents reproduced by the controlled device, there may be a case in which the users may want to listen to different types of sound.

SUMMARY

In light of the foregoing, it is desirable to provide a control device, a sound switching method of a control device, and a program which are capable of switching an output sound to a predetermined sound according to a contents-reproduction status of a controlled device.

In accordance with an embodiment, a control device may include a control unit to switch an output information to a predetermined output information, when a transition of contents of a controlled device is detected.

In accordance with another embodiment, a control method may include switching, by a processor, of an output information to a predetermined output information, when a transition of contents of a controlled device is detected.

In accordance with another embodiment, a non-transitory recording medium may be recorded with a computer readable program executable by a computer, where the program includes switching of an output information to a predetermined output information, when a transition of contents of a controlled device is detected.

BRIEF DESCRIPTION OF THE DRAWINGS

FIG. 5 is a diagram illustrating an example of a sound switching status;

FIG. 7 is a diagram illustrating an example of a subtitle switching status;

FIG. 9 is a flowchart illustrating an operation of a commander according to the second embodiment; and FIG. 10 is a diagram illustrating an example of a sound switching status.

DETAILED DESCRIPTION OF THE EMBODIMENTS

Figure 1:
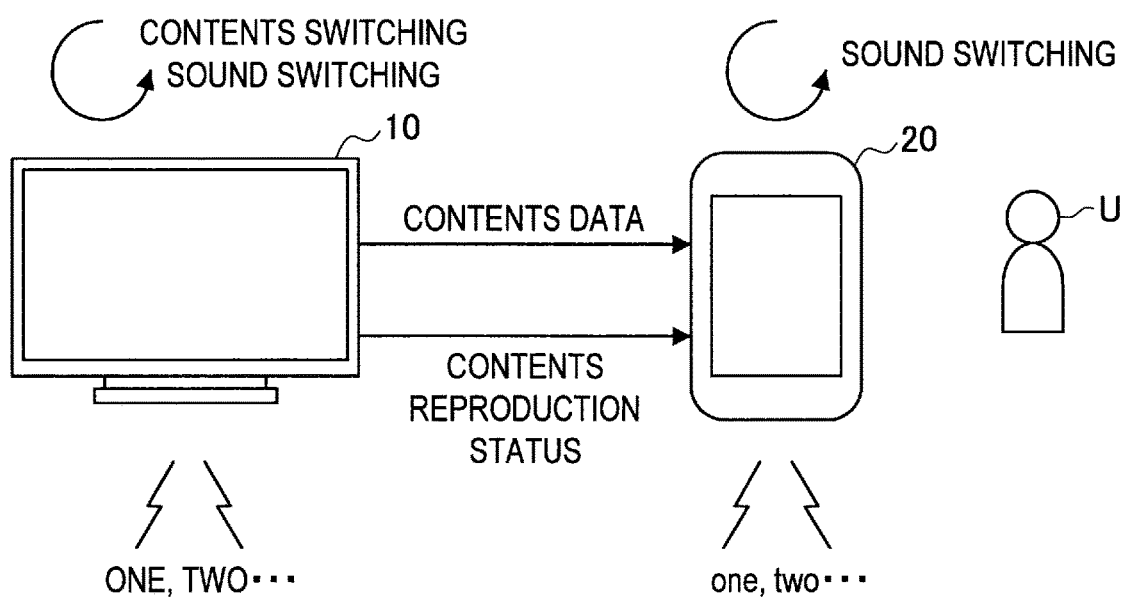
FIG. 1 is a diagram illustrating an overview of a cooperative system according to the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

[1. Overview of Cooperative System]

Figure 2:
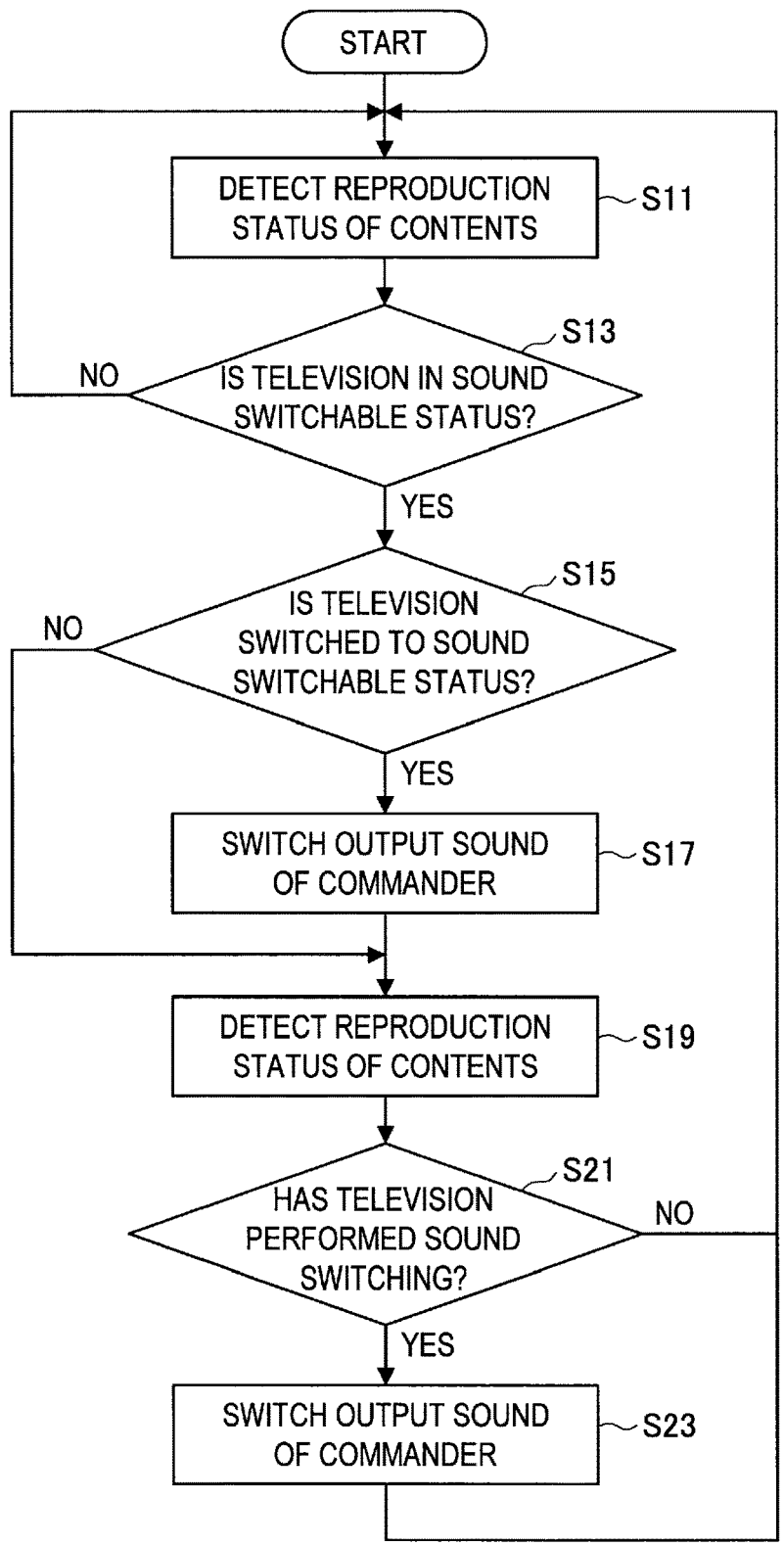
FIG. 2 is a flowchart illustrating a sound switching method of a commander according to the present disclosure.

First, an overview of a cooperative system according to the present disclosure will be described with reference to FIGS. 1 and 2. FIG. 1 is a diagram illustrating the overview of the cooperative system according to the present disclosure, and FIG. 2 is a flowchart illustrating a sound switching method of a commander 20 according to the present disclosure.

As illustrated in FIG. 1, the cooperative system includes a controlled device (a television 10) and a control device (a commander 20) for controlling the controlled device. The controlled device and the control device can communicate with each other through a wired or wireless communication line or through a network according to the circumstances. The controlled device is a device capable of reproducing contents such as a television, a recorder, or a personal computer (PC). The control device is a device capable of outputting (reproducing) at least the sound of the contents such as a commander, a mobile phone, a personal digital assistant (PDA), or a PC. A description will be made below in connection with a case in which the controlled device is the television 10, and the control device is the commander 20 operated by a user U.

The television 10 reproduces contents and outputs a video and a sound of the contents. The commander 20 reproduces contents and outputs a sound of the contents. The commander 20 also outputs a video according to circumstances. The television 10 performs contents switching or sound switching, and the commander 20 performs sound switching according to a reproduction status of contents by the television 10. The commander 20 receives contents data from the television 10 and detects the reproduction status of the contents by the television 10. In an example illustrated in FIG. 1, at the time of reproduction of multiplex-sound contents, the television 10 outputs a main sound (for example, Japanese), and the commander 20 outputs a sub sound (for example, English).

Figure 3:
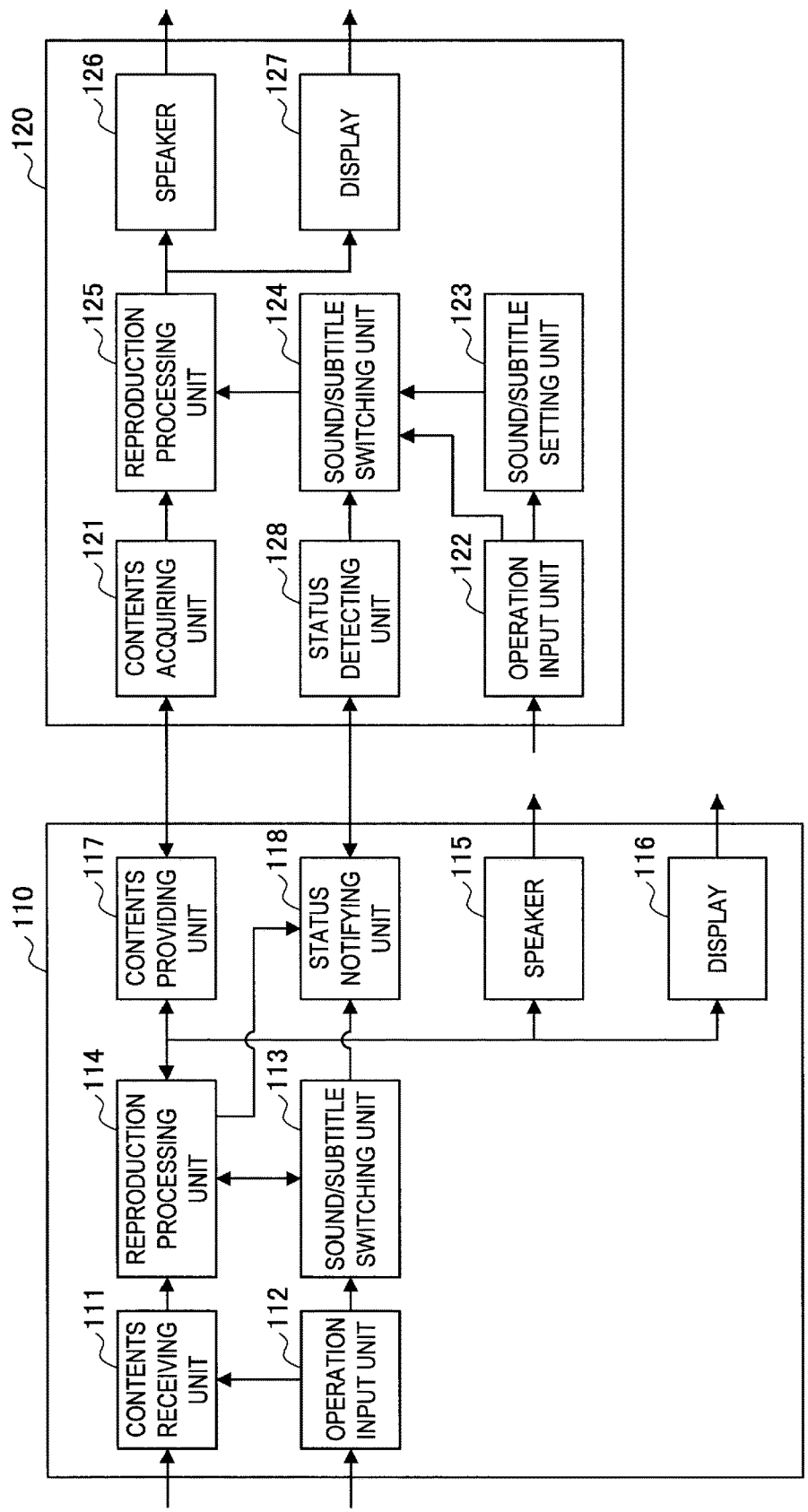
FIG. 3 is a block diagram illustrating a functional configuration of a cooperative system according to a first embodiment of the present disclosure.
Figure 8:
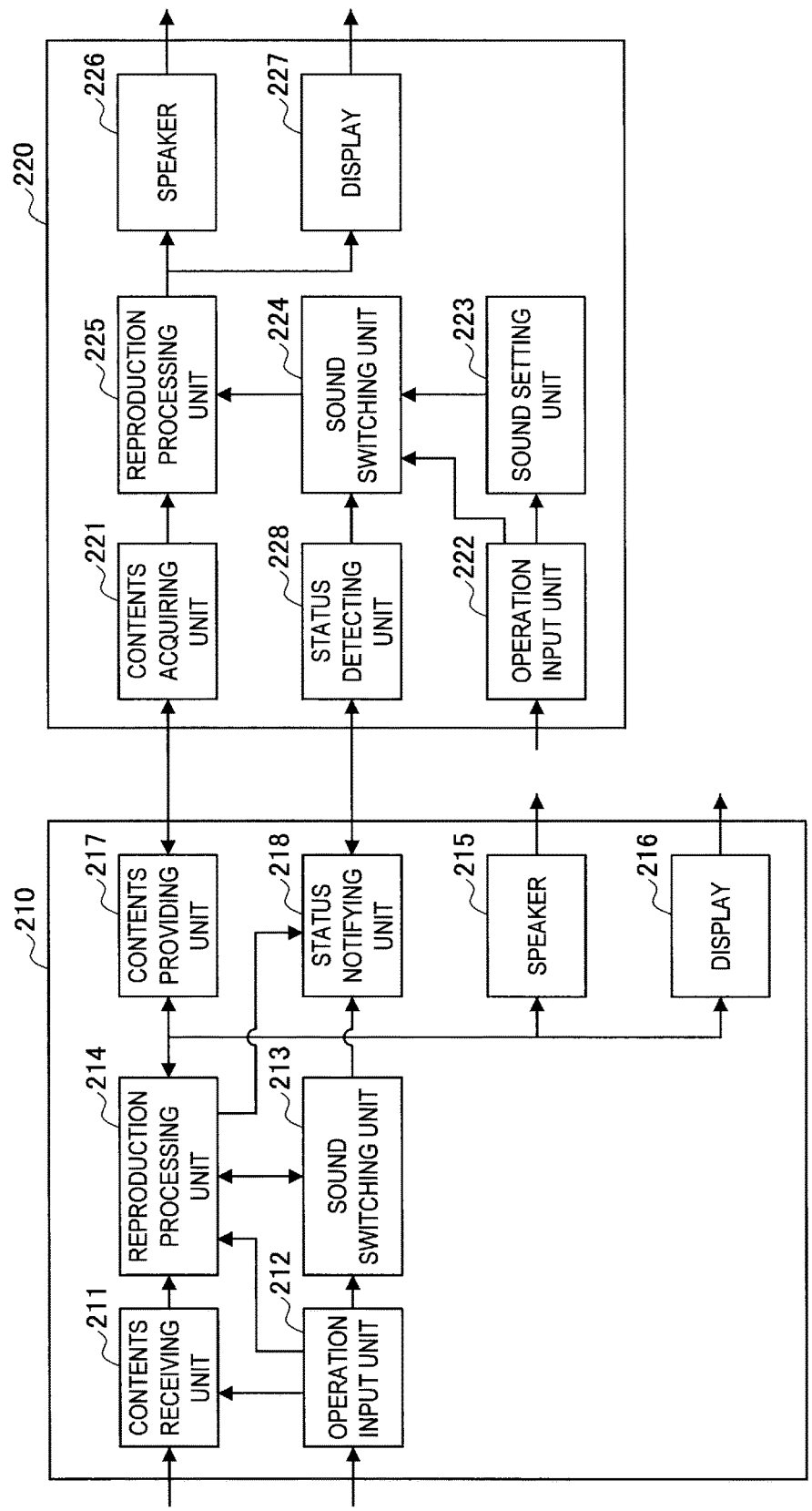
FIG. 8 is a block diagram illustrating a functional configuration of a cooperative system according to a second embodiment of the present disclosure.

The television 10 and the commander 20 illustrated in FIG. 1 correspond to a television 110 and a commander 120 illustrated in FIG. 3 or a television 210 and a commander 220 illustrated in FIG. 8, which will be described later, respectively.

As illustrated in FIG. 2, the commander 20 detects the reproduction status of the contents by the television 10 (step S11) and determines whether or not the television 10 is in a sound switchable status (step S13). Then, when the condition is satisfied, a subsequent process is performed, whereas when the condition is not satisfied, the detection and determination of the reproduction status (steps S11 and S13) are repeated.

When the television 10 is in the sound switchable status, it is determined whether or not the television 10 has just transitioned to the sound switchable status, that is, whether or not it is directly after the television 10 has entered the sound switchable status (step S15). Then, when the condition is satisfied, an output sound of the commander 20 is switched to a predetermined sound (step S17).

Further, when the television 10 is in the sound switchable status, the reproduction status of contents by the television 10 is detected (step S19), and it is determined whether or not the television 10 has performed the sound switching (step S21). When the condition is satisfied, the output sound of the commander 20 is switched to a predetermined sound (step S23). However, when the condition is not satisfied, the process restarts from the beginning (step S11).

As described above, when the television 10 transitions to the sound switchable status or performs the sound switching, the output sound of the commander 20 is switched to a predetermined sound. That is, the commander 20 can switch the output sound to the predetermined sound according to the reproduction status of contents by the television 10. For example, an output sound different from the output sound of the television 10 may be set as the predetermined sound.

[2-1. Configuration of Cooperative System According to First Embodiment]

Next, the configuration of a cooperative system according to a first embodiment of the present disclosure will be described with reference to FIG. 3. FIG. 3 is a block diagram illustrating the functional configuration of the cooperative system according to the first embodiment of the present disclosure. As illustrated in FIG. 3, the cooperative system includes a television 110 and a commander 120 which can communicate with each other through a wired or wireless communication line.

The television 110 includes a contents receiving unit 111, an operation input unit 112, a sound/subtitle switching unit 113, a reproduction processing unit 114, a speaker 115, a display 116, a contents providing unit 117, and a status notifying unit 118.

The contents receiving unit 111 receives the contents data through an antenna (not shown) or a network and provides the reproduction processing unit 114 with the received contents data. The contents receiving unit 111 switches the reception of the contents data automatically according to a time table of the contents or a contents switching command which will be described later.

The contents data includes at least sound data. As the contents, there may be received as single-sound contents including only main sound data as the sound data or multiplex-sound contents including data of at least the main sound and the sub sound. According to the circumstances, subtitle/sound contents further including subtitle data of the main sound and the sub sound may be received as the contents.

The operation input unit 112 may be configured with a receiving device that receives an operation signal from operation buttons of the television 110 body or the like and/or the commander 120 or a television 110 remote controller. The operation input unit 112 receives an operation command from the user. The operation input unit 112 instructs the contents receiving unit 111 to perform contents switching in response to a contents switching command and instructs the sound/subtitle switching unit 113 to perform sound/subtitle switching in response to a sound/subtitle switching command. Through the sound/subtitle switching command, the main sound, the sub sound, or mute is designated as an output sound, and a main sound subtitle, a sub sound subtitle, or subtitle hidden is designated as an output subtitle.

The sound/subtitle switching unit 113 stores a setting value of an output sound/subtitle of the television 110. The setting value is designated by the sound/subtitle switching command. When the setting value is changed, the sound/subtitle switching unit 113 notifies the status notifying unit 118 of a changed setting value.

The reproduction processing unit 114 performs a reproduction process of the contents data and provides the speaker 115 and the display 116 with a processing result. The reproduction processing unit 114 determines the type of contents by analyzing the contents data, extracts video data and sound data from the contents data, and extracts subtitle data according to circumstances. The sound data and the subtitle data are extracted according to the setting value of the output sound/subtitle. When the type of contents is changed, the contents switching is notified to the sound/subtitle switching unit 113 and the status notifying unit 118.

The speaker 115 outputs a sound corresponding to the extracted sound data, and the display 116 outputs a video corresponding to the extracted video data and a subtitle corresponding to the extracted subtitle data.

The contents providing unit 117 transmits at least a part of the contents data to the commander 120. For example, the contents providing unit 117 receives the setting value of the output sound/subtitle of the commander 120 which will be described later from the commander 120, acquires the sound data/subtitle data corresponding to the setting value of the output sound/subtitle from the reproduction processing unit 114, and transmits the sound data/subtitle data to the commander 120. Alternatively, the contents providing unit 117 may transmit the contents data received by the contents receiving unit 111 to the commander 120 as it is.

The status notifying unit 118 generates status information representing contents switching or sound/subtitle switching and notifies the commander 120 of the status information (transmits the status information to the commander 120). The status information may be periodically transmitted in response to polling from the commander 120 or may be transmitted in response to contents switching or sound/subtitle switching as necessary.

The commander 120 includes a contents acquiring unit 121, an operation input unit 122, a sound/subtitle setting unit (an output setting unit) 123, a sound/subtitle switching unit (an output switching unit) 124, a reproduction processing unit 125, a speaker 126, a display 127, and a status detecting unit 128.

The contents acquiring unit 121 receives at least a part of the contents data from the television 110 and provides the reproduction processing unit 125 with a reception result. For example, the contents acquiring unit 121 may transmit the setting value of the output sound/subtitle of the commander 120 to the television 110 and receive the sound data/subtitle data corresponding to the setting value of the output sound/subtitle from the television 110. Alternatively, the contents acquiring unit 121 may receive the contents data from the television 110 as it is. The contents data or the sound data/subtitle data may be acquired from another controlled device or an external device instead of the television 110.

The operation input unit 122 is configured with operation buttons of the commander 120 and/or graphical user interface (GUI) buttons displayed on the display 127 of the commander 120 and receives an operation command from the user U. The operation input unit 122 instructs the sound/subtitle setting unit 123 to perform the setting of the output sound/subtitle in response to the sound/subtitle setting command and receives the user U's operation input for selecting the output sound/subtitle, for example, through a GUI menu which will be described later. Further, when the commander 120 includes a touch panel, part of the operation input unit 122 may be formed integrally with the display 127 so as to receive an operation input through the touch panel.

The sound/subtitle setting unit 123 stores a default setting value of the output sound/subtitle of the commander 120. The default value specifies the output sound/subtitle of the commander 120 that is switched according to the reproduction status of contents by the television 110 and may be set through the sound/subtitle setting command.

The sound/subtitle switching unit 124 stores a current setting value of the output sound/subtitle of the commander 120. The current value is changed according to the contents switching or the sound/subtitle switching of the television 110 based on the status information notified from the television 110. The current value is changed to a default value when the default value is set, but the current value is changed in response to the user U's operation input when the default value is not set.

The reproduction processing unit 125 performs a reproduction process on at least a part of the contents data and provides the speaker 126 and/or the display 127 with a processing result. The reproduction processing unit 125 performs predetermined processing on the sound data/subtitle data corresponding to setting of the output sound/subtitle of the commander 120. Alternatively, the reproduction processing unit 125 extracts video data and sound data from the contents data and extracts subtitle data according to the circumstances. In particular, the sound data and the subtitle data are extracted according to the current setting value of the output sound/subtitle stored in the sound/subtitle switching unit 124.

The speaker 126 outputs a sound corresponding to the sound data designated by the current setting value of the output sound/subtitle. The display 127 outputs a video corresponding to the video data and a subtitle corresponding to the subtitle data designated by the current setting value of the output sound/subtitle.

The status detecting unit 128 receives the status information representing contents switching or sound/subtitle switching of the television 110 from the television 110 and notifies the sound/subtitle switching unit 124 of the status information.

The components of the television 110 and the commander 120 are configured with hardware such as a logic circuit and/or software such as a program. For example, the component configured with software may be implemented by executing a program on a central processing unit (CPU) (not shown).

[2-2. Operation of Cooperative System According to First Embodiment]

Figure 4:
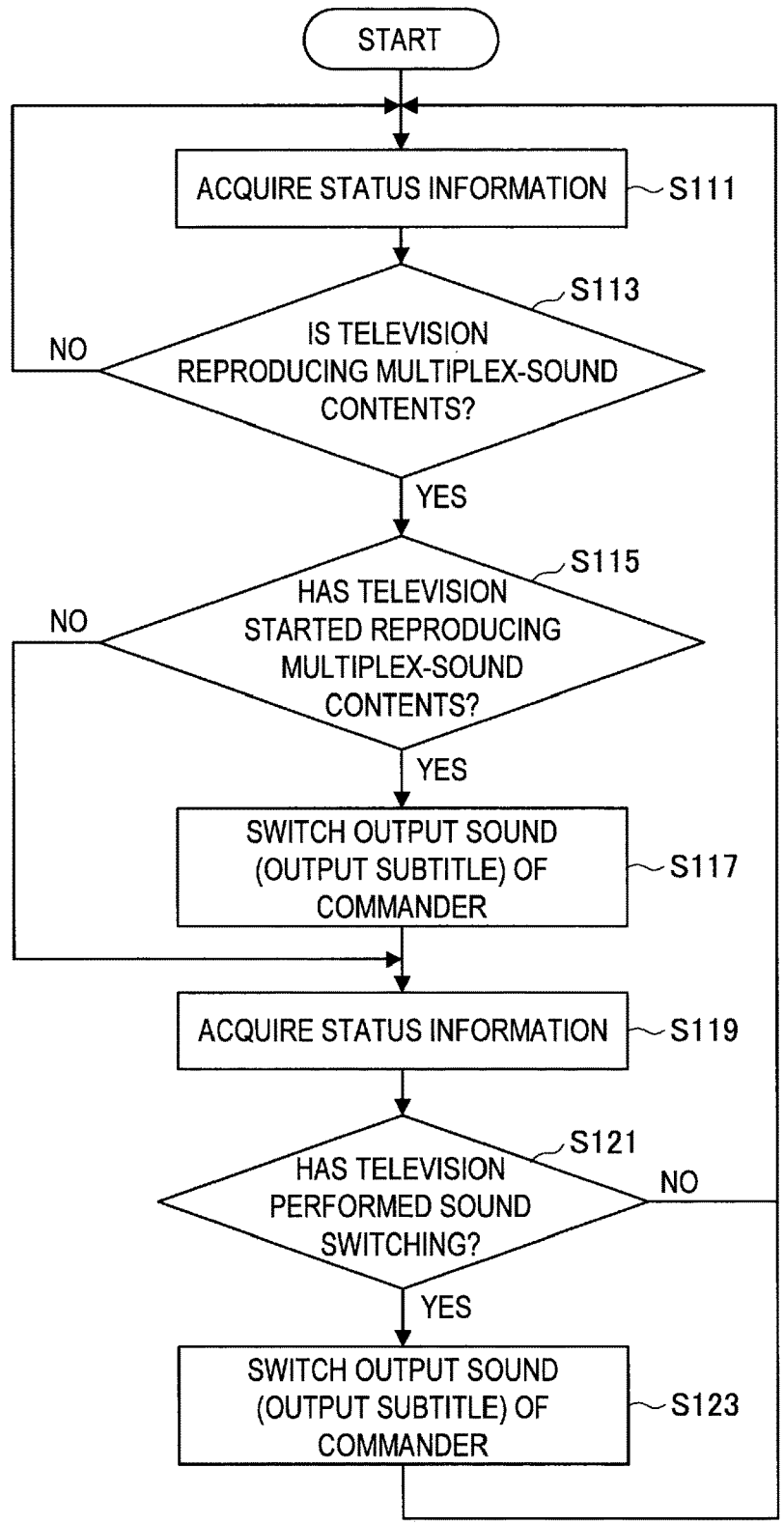
FIG. 4 is a flowchart illustrating an operation of a commander according to the first embodiment.
Figure 6:
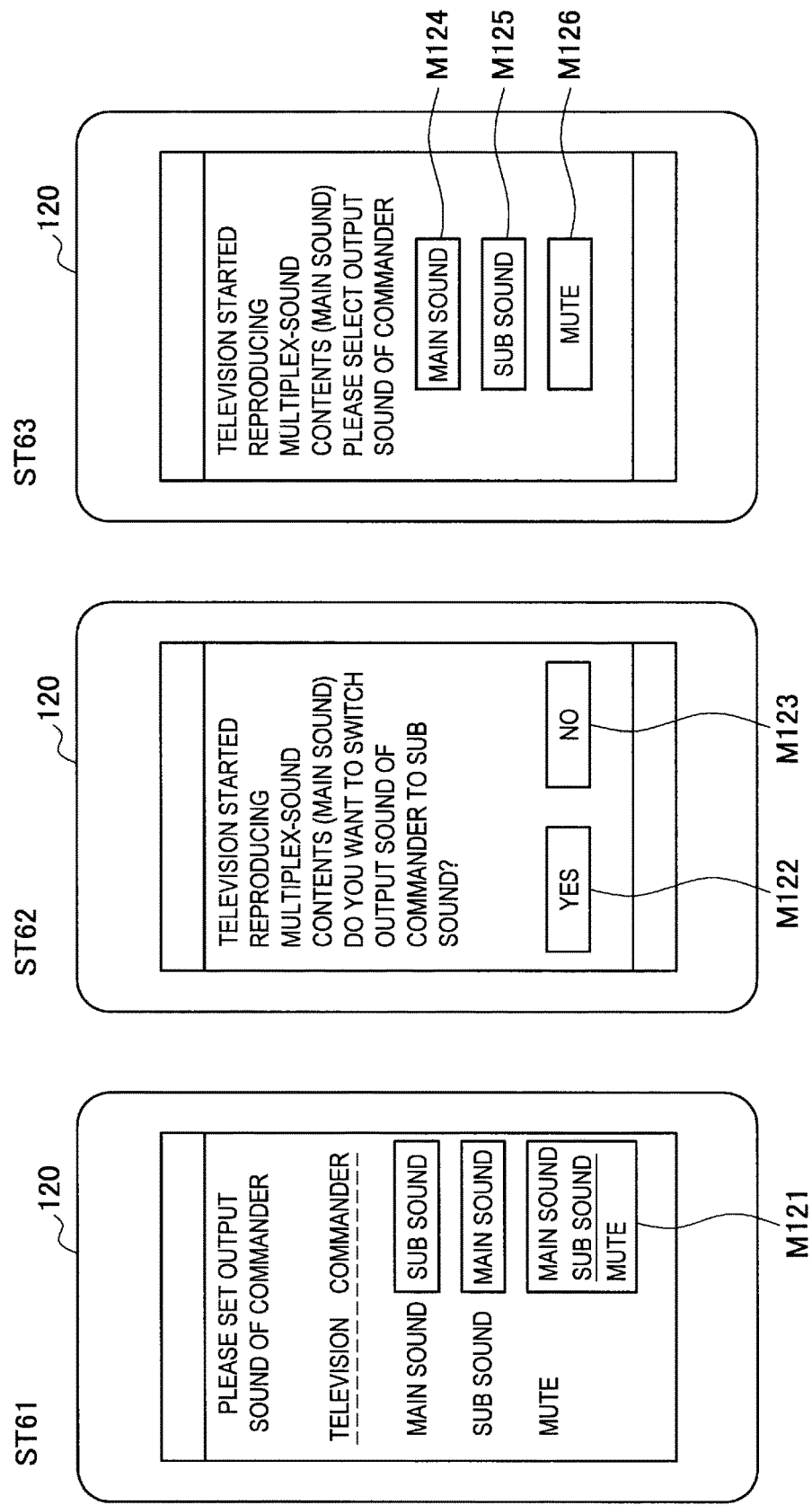
FIG. 6 is a diagram illustrating an example of a GUI menu used for sound switching.

Next, the operation of the commander 120 according to the first embodiment will be described with reference to FIGS. 4 to 7. FIG. 4 is a flowchart illustrating the operation of the commander 120 according to the first embodiment. FIG. 5 is a diagram illustrating an example of a sound switching status. FIG. 6 is a diagram illustrating an example of a GUI menu used for sound switching. FIG. 7 is a diagram illustrating an example of a subtitle switching status.

As illustrated in FIG. 4, the status detecting unit 128 acquires the status information from the television 110 (step S111). The sound/subtitle switching unit 124 determines whether or not the television 110 is in the sound switchable status based on the status information. For example, the sound/subtitle switching unit 124 determines whether or not the television 110 is reproducing the multiplex-sound contents (step S113). Then, the commander 120 performs a subsequent process when the condition is satisfied but repeats the detection and determination of the reproduction status when the condition is not satisfied (steps S111 and S113).

When the television 110 is in the sound switchable status, the sound/subtitle switching unit 124 determines whether or not it is directly after the television 110 has transitioned to the sound switchable status. For example, the sound/subtitle switching unit 124 determines whether or not it is directly after the television 110 has started reproducing the multiplex-sound contents (step S115). Then, when the condition is satisfied, the commander 120 switches the output sound of the commander 120 to a predetermined sound and switches the output subtitle to a predetermined subtitle according to the circumstances (step S117).

Further, when the television 110 is in the sound switchable status, the status detecting unit 128 acquires the status information from the television 110 (step S119). The sound/subtitle switching unit 124 determines whether or not the television 110 performs sound switching based on the status information (step S121). Then, when the condition is satisfied, the commander 120 switches the output sound of the commander 120 to a predetermined sound and switches the output subtitle to a predetermined subtitle according to the circumstances (step S123).

In FIG. 5, the output sound of the television 110 is illustrated together with the television 110, and the output sound of the commander 120 is illustrated together with the commander 120. In the example illustrated in FIG. 5, in the television 110, the output setting value on the multiplex-sound contents is set to "main sound". Further, in the commander 120, "sub sound", "main sound", and "sub sound" are set as default values on the output sounds "main sound", "sub sound", and "mute" of the television 110, respectively. For example, the sound data of the multiplex-sound contents include main sound data of Japanese and sub sound data of English.

For example, outputting setting may be performed by designating the output sound of the commander 120 for each output sound of the television 110 using a GUI menu illustrated in status ST61 of FIG. 6. Through the menu, any one of output sounds "main sound", "sub sound", and "mute" displayed on a list box M121 is selected for each output sound of the television 110.

In status ST51, the television 110 is reproducing single-sound contents and outputting the main sound of the contents. For example, in the commander 120, it is assumed that the default value of the single-sound contents is set to "mute". For this reason, the commander 120 does not output the sound of the contents.

In status ST52, the television 110 switches the contents to the multiplex-sound contents and outputs the main sound of the contents according to the output setting value of the multiplex-sound contents. The commander 120 detects contents switching by the television 110, switches the output sound to the sub sound according to the default value of the multiplex-sound contents, and outputs the sub sound of the contents.

When the default value has been set, for example, sound switching may be performed using a GUI menu as illustrated in status ST62 of FIG. 6 after the user U confirms the sound switching. In this GUI, the sound switching is executed when a "Yes" button M122 is pressed down, whereas the sound switching is canceled when a "No" button M123 is pressed down.

In status ST53, the television 110 switches the output sound to the sub sound and outputs the sub sound of the contents. The commander 120 detects the sound switching by the television 110, switches the output sound to the main sound according to the default value, and outputs the main sound of the contents.

In status ST54, the television 110 switches the output sound to mute and does not output the sound of the contents. The commander 120 detects the mute switching of the television 110 as the sound switching, switches the output sound to the sub sound according to the default value, and outputs the sub sound of the contents.

FIG. 5 illustrates one form of sound switching, and sound switching may be performed in another form. For example, the example illustrated in FIG. 5 has been described in connection with the case in which sound switching is performed based on the default value. However, sound switching may be performed without using the default value or may be performed using the default value only on a specific output sound of the television 110.

Here, when the default value has not been set, for example, sound switching may be performed by having the user U to select the type of output sound using a GUI menu illustrated in status ST63 of FIG. 6. When any one of "main sound", "sub sound", and "mute" buttons M124, M125, and M126 is selected in this menu, sound switching to the selected output sound is performed.

In FIG. 7, an output sound/subtitle of the television 110 is illustrated together with the television 110, and an output sound/subtitle of the commander 120 is illustrated together with the commander 120. In the example illustrated in FIG. 7, in the television 110, the output setting value on subtitle/sound contents is set to "main sound". Further, in the commander 120, the default values on the output sounds "main sound", "sub sound", and "mute" of the television 110 are set to "main sound, main sound subtitle", "sub sound, sub sound subtitle", and "mute, subtitle hidden", respectively. The output setting may be performed by designating the output sound/subtitle of the commander 120 for each of the output sounds of the television 110. Further, the output setting may be performed by designating only the output subtitle.

In status ST71, the television 110 is reproducing single-sound contents and outputting the main sound of the contents. For example, in the commander 120, it is assumed that the default value of the single-sound contents is set to "mute". For this reason, the commander 120 does not output the sound of the contents.

In status ST72, the television 110 switches the contents to the subtitle/sound contents and outputs the main sound of the contents according to the default value of the subtitle/sound contents. The commander 120 detects the contents switching by the television 110, switches the output sound to the main sound and the output subtitle to the main sound subtitle according to the default value of the subtitle/sound contents, and outputs the main sound and the main sound subtitle of the contents. When the default value has been set, the subtitle switching may be performed after the user U confirms the subtitle switching similarly to the first embodiment.

In status ST73, the television 110 switches the output sound to the sub sound and outputs the sub sound of the contents. The commander 120 detects the sound switching by the television 110, switches the output sound to the sub sound and the output subtitle to the sub sound subtitle according to the default value, and outputs the sub sound and the sub sound subtitle of the contents.

In status ST74, the television 110 switches the output sound to mute and the output subtitle to the main sound subtitle and outputs the main sound subtitle of the contents. The commander 120 detects the mute switching of the television 110 as the sound switching, switches the output sound to mute and the output subtitle to subtitle hidden according to the default value, and does not output the sound and the subtitle of the contents.

FIG. 7 illustrates one form of subtitle switching, and subtitle switching may be performed in another form. For example, the example illustrated in FIG. 7 has been described in connection with the case in which subtitle switching is performed based on the default value. However, subtitle switching may be performed without using the default value or may be performed using the default value only on a specific output sound of the television 110. When the default value has not been set, subtitle switching may be performed by having the user U to select the type of output subtitle similarly to the first embodiment. Further, when the output subtitle of the television 110 is switched to the main sound subtitle, the output sound of the commander 120 may be switched to the sub sound, and the output subtitle may be switched to the sub subtitle. That is, the output sound and the output subtitle of the commander 120 may be switched according to the switching of the output subtitle by the television 110.

As described above, according to the commander 120 of the first embodiment, when the television 110 transitions to the sound switchable status (reproduction of the multiplex-sound contents) or performs the sound switching, the output sound of the commander 120 is switched to a predetermined sound, and the output subtitle is switched to a predetermined subtitle according to the circumstances. That is, the commander 120 can switch the output sound/subtitle to a predetermined sound/subtitle according to the reproduction status of contents by the television 110. For example, when plural users U view contents reproduced by the television 110, the user U who desires to listen to the sound/subtitle that is not output from the television 110 can enjoy the content while listening to a desired sound/subtitle by appropriately setting the output sound/subtitle of the commander 120.

[3-1. Configuration of Cooperative System According to Second Embodiment]

Next, a configuration of a cooperative system according to a second embodiment of the present disclosure will be described with reference to FIG. 8. FIG. 8 is a block diagram illustrating a functional configuration of the cooperative system according to the second embodiment of the present disclosure. As illustrated in FIG. 8, the cooperative system includes a television 210 and a commander 220. The television 210 has a function capable of simultaneously displaying two or more contents, and the commander 220 switches the output sound to a predetermined sound according to the reproduction status of the two or more contents by the television 210. A duplicated description with the first embodiment will be omitted below.

The television 210 operates in a single-screen mode or a multi-screen mode. One content is reproduced in the single-screen mode, and for example, two contents of the main screen contents and the sub screen contents are simultaneously reproduced in the multi-screen mode. The television 210 can perform the switching between the single-screen mode and the multi-screen mode (screen mode switching). Further, the television 210 can perform mutual switching between the main screen contents and the sub screen contents (main/sub screen switching). Of course, independent switching of main screen contents or sub screen contents (contents switching) may be performed.

The television 210 includes a contents receiving unit 211, an operation input unit 212, a sound switching unit 213, a reproduction processing unit 214, a speaker 215, a display 216, a contents providing unit 217, and a status notifying unit 218.

The contents receiving unit 211 receives contents data of the main screen contents in the single-screen mode or receives contents data of the main screen contents and the sub screen contents in the multi-screen mode. The contents receiving unit 211 provides the reproduction processing unit 214 with the reception results. The contents data includes at least sound data. The contents may be any one of the single-sound contents, the multiplex-sound contents, and the subtitle/sound contents, but the following description will be made in connection with a case in which the contents is the single-sound contents.

The operation input unit 212 instructs the contents receiving unit 211 and the reproduction processing unit 214 to perform the screen mode switching according to a screen mode switching command and instructs the reproduction processing unit 214 to perform the main/sub screen switching according to a main/sub screen switching command. The operation input unit 212 instructs the contents receiving unit 211 to perform contents switching according to a contents switching command and instructs the sound switching unit 213 to perform the sound switching according to a sound switching command.

The sound switching unit 213 stores a setting value of an output sound of the television 210. The setting value is changed according to the screen mode switching, the main/sub screen switching, the contents switching, or the sound switching. In the case of the sound switching, the setting value is designated by the sound switching command. When the setting value is changed, the sound switching unit 213 notifies the status notifying unit 218 of a changed setting value.

In the single-screen mode, the reproduction processing unit 214 extracts the video data and the sound data of the main screen contents from the contents data. In the multi-screen mode, the reproduction processing unit 214 extracts the video data of the main screen contents and the sub screen contents from the contents data and extracts the sound data of the main screen contents or the sub screen contents according to a current output setting value. When the screen mode switching, the main/sub screen switching, or the contents switching is performed, the switching is notified to the sound switching unit 213 and the status notifying unit 218.

The status notifying unit 218 generates the status information representing the screen mode switching, the main/sub screen switching, the contents switching, or the sound switching and notifies the commander 220 of the status information (transmits the status information to the commander 220). The status information may be periodically transmitted according to polling from the commander 220 or may be transmitted according to the switching as necessary.

The commander 220 includes a contents acquiring unit 221, an operation input unit 222, a sound setting unit (an output setting unit) 223, a sound switching unit (an output switching unit) 224, a reproduction processing unit 225, a speaker 226, a display 227, and a status detecting 228.

The sound setting unit 223 stores a default setting value of the output sound of the commander 220. The default value specifies the output sound of the commander 220 that is switched according to the reproduction status of the contents by the television 210 and can be set by the sound setting command.

The sound switching unit 224 stores a current setting value of the output sound of the commander 220. The current value is changed according to the screen mode switching, the main/sub screen switching, the contents switching, or the sound switching in the television 210 based on the status information notified from the television 210. The current value is changed to a default value when the default value is set, but the current value is changed in response to the user U's operation input when the default value is not set.

The reproduction processing unit 225 performs predetermined processing on the sound data corresponding to the setting of the output sound of the commander 220. Alternatively, the reproduction processing unit 225 extracts the video data and the sound data from the contents data. In particular, the sound data is extracted according to the current output setting value stored in the sound switching unit 224.

The status detecting unit 228 receives the status information representing the screen mode switching, the main/sub screen switching, the contents switching, or the sound switching in the television 210 from the television 210 and notifies the sound switching unit 224 of the status information.

[3-2. Operation of Cooperative System According to Second Embodiment]

Next, an operation of the commander 220 according to the second embodiment will be described with reference to FIGS. 9 and 10. FIG. 9 is a flowchart illustrating an operation of the commander 220 according to the second embodiment. FIG. 10 is a diagram illustrating an example of a sound switching status.

As illustrated in FIG. 9, the status detecting unit 228 acquires the status information from the television 210 (step S211). The sound switching unit 224 determines whether or not the television 210 is in the sound switchable status based on the status information. For example, the sound switching unit 224 determines whether or not the television 210 is simultaneously reproducing two or more contents in the multi-screen mode (step S213). Then, the commander 220 performs a subsequent process when the condition is satisfied but repeats the detection and determination of the reproduction status when the condition is not satisfied (steps S211 and S213).

When the television 210 is in the sound switchable status, the sound switching unit 224 determines whether or not it is directly after the television 210 has transitioned to the sound switchable status. For example, the sound switching unit 224 determines whether or not it is directly after the television 210 has started reproducing two or more contents in the multi-screen mode at the same time (step S215). Then, when the condition is satisfied, the commander 220 switches the output sound of the commander 220 to a predetermined sound (step S217).

Further, when the television 210 is in the sound switchable status, the status detecting unit 228 acquires the status information from the television 210 (step S219). The sound switching unit 224 determines whether or not the television 210 has performed sound switching based on the status information (the sound switching by the main/sub screen switching or the content switching is also included) (step S221). Then, when the condition is satisfied, the commander 220 switches the output sound of the commander 220 to a predetermined sound (step S223).

FIG. 10 illustrates an example of a sound switching status. In the multi-screen mode, for example, one of weather forecast contents and news contents is displayed on a main screen set on the whole display area, and the other is displayed on a sub screen set on an upper right portion of the display area. Setting of the display area and the type of contents displayed on multiple screens are not limited to the examples illustrated in FIG. 10.

In FIG. 10, the output sound of the television 210 is illustrated together with the television 210, and the output sound of the commander 220 is illustrated together with the commander 220. In the example illustrated in FIG. 10, in the television 210, the output setting value of the multi-screen mode is set to "main screen sound". Further, in the commander 220, "sub screen sound", "main screen sound", and "sub screen sound" are set as default values on the output sounds "main screen sound", "sub screen sound", and "mute" of the television 210, respectively. The main screen sound refers to a sound of the main screen contents and the sub screen sound refers to a sound of the sub screen contents. Output setting is performed by designating the output sound of the commander 220 for each output sound of the television 210.

In status ST101, the television 210 is in the single-screen mode and reproducing the main screen sound (sound of weather forecast contents). For example, in the commander 220, it is assumed that the default value of the single-screen mode is set to "mute". For this reason, the commander 220 does not output the sound.

In status ST102, the television 210 switches the screen mode to the multi-screen mode and outputs the main screen sound (sound of weather forecast contents) according to the default value of the multi-screen mode. The commander 220 detects the screen mode switching by the television 210, switches the output sound to the sub screen sound according to the default value of the multi-screen mode, and outputs the sub screen sound (sound of news contents). When the default value has been set, the sound switching may be performed after the user U confirms sound switching similarly to the first embodiment.

In status ST103, the television 210 switches the main screen and the sub screen to each other by main/sub screen switching and outputs the main screen sound (sound of news contents) after screen switching according to the default value. The commander 220 detects the sound switching by the main/sub screen switching by the television 210, switches the output sound to the sub screen sound after the main/sub screen switching according to the default value, and outputs the sub screen sound (sound of weather forecast contents).

In status ST104, the television 210 switches the output sound to the sub screen sound and outputs the sub screen sound (sound of weather forecast contents). The commander 220 detects the sound switching by the television 210, switches the output sound to the main screen sound according to the default value, and outputs the main screen sound (sound of news contents).

In status ST105, the television 210 switches the output sound to mute and does not output the sound. The commander 220 detects the mute switching of the television 210 as sound switching, switches the output sound to the sub screen sound according to the default value, and outputs the sub screen sound (sound of weather forecast contents).

FIG. 10 illustrates one form of sound switching, and sound switching may be performed in another form. For example, the example illustrated in FIG. 10 has been described in connection with the case in which sound switching is performed based on the default value. However, sound switching may be performed without using the default value or may be performed using the default value only on a specific output sound of the television 210. When the default value has not been set, sound switching may be performed by having the user U to select the type of output sound.

As described above, according to the commander 220 of the second embodiment, when the television 210 transitions to the sound switchable status (simultaneous reproduction of two or more contents) or performs sound switching, the output sound of the commander 220 is switched to a predetermined sound. Thus, the commander 220 can switch the output sound to a predetermined sound according to the reproduction status of contents by the television 210. For example, when plural users U view two or more contents reproduced by the television 210, the user U who desires to listen to the sound that is not output from the television 210 can enjoy the contents by a desired sound by appropriately setting the output sound of the commander 220.

It should be understood by those skilled in the art that various modifications, combinations, sub-combinations and alterations may occur depending on design requirements and other factors insofar as they are within the scope of the appended claims or the equivalents thereof.

For example, the above embodiments have been described in connection with the case in which the cooperative system includes the television 110 or 210 and one commander 120 or 220. However, the above embodiment can be similarly applied even when the cooperative system includes the television 110 and two or more commanders. In this case, in the two or more commanders, different output sounds/subtitles may be set.

For example, the second embodiment has been described in connection with sounds of two contents of main screen contents and sub screen contents are switched. However, sounds of three or more contents may be switched. In the second embodiment, there may be reproduced contents that do not include video data, that is, contents that do not include a video which is to be displayed on any one of multiple screens. Further, when multiplex-sound contents or subtitle/sound contents are reproduced in the multi-screen mode, for example, the television 210 may output the main sound of the main screen contents, and the commander 220 may output the sub sound of the sub screen contents or the main sound subtitle of the main screen contents.

It should be noted that the present disclosure can also take the following configurations.

[1]. A control device, comprising:

a status detecting unit that detects a reproduction status of one or more contents by a controlled device; and an output switching unit that switches an output sound of the control device to a predetermined sound when transition or sound switching of the controlled device to a sound switchable status is detected.

[2]. The control device according to [1], wherein the output switching unit switches the output sound of the control device to a sound different from the output sound of the controlled device.

[3]. The control device according to [1], wherein the status detecting unit detects reproduction start of multiplex-sound contents by the controlled device as the transition to the sound switchable status.

[4]. The control device according to [1], wherein the status detecting unit detects start of simultaneous reproduction of two or more contents by the controlled device as the transition to the sound switchable status.

[5]. The control device according to [1], wherein the status detecting unit detects mute of the output sound of the controlled device in the sound switchable status as the sound switching.

[6]. The control device according to [1], further comprising:

an output setting unit that sets in advance the output sound of the control device on the output sound of the controlled device, wherein the output switching unit switches the output sound of the control device to the previously set sound according to the output sound of the controlled device.

[7]. The control device according to [1], wherein the output switching unit switches an output subtitle of the control device to a predetermined subtitle when the transition or the sound switching of the controlled device to the sound switchable status is detected.

[8]. The control device according to [7], wherein the output setting unit set in advance the output subtitle of the control device on the output sound of the controlled device, and the output switching unit switches the output subtitle of the control device to the previously set subtitle according to the output sound of the controlled device.

[9]. A sound switching method of a control device, comprising:

detecting a reproduction status of one or more contents by a controlled device; and switching an output sound of the control device to a predetermined sound when transition or sound switching of the controlled device to a sound switchable status is detected.

[10]. A program causing a computer to execute a sound switching method of a control device, the method comprising:

detecting a reproduction status of one or more contents by a controlled device; and switching an output sound of the control device to a predetermined sound when transition or sound switching of the controlled device to a sound switchable status is detected.

What is claimed is:

1. A control device comprising:

a control unit configured to switch an output content information of the control device to a predetermined output content information, when a transition of contents of a controlled device is detected based on a result of a determination from status information from the controlled device whether the controlled device is transitioned to a sound switchable status, wherein, when the controlled device is determined to be in the sound switchable status by the control unit, the control unit is configured to determine, from the status information, whether the controlled device is determined to be in the sound switchable status directly after the controlled device has transitioned from a state of reproducing single-sound contents to the sound switchable status, in which the result is based on a second determination from the status information whether the controlled device is reproducing multiplex-sound contents, in which the status information indicates a second result of a third determination at the controlled device whether transition of type of contents being reproduced at the controlled device is to the multiplex-sound contents, and is based on analyzing of contents data by circuitry of the controlled device, and in which the controlled device is determined to be in the sound switchable status directly after the controlled device has transitioned from the state of reproducing the single-sound contents to the sound switchable status, when the status information is determined to indicate the controlled device started reproducing the multiplex-sound contents directly after reproducing the single-sound contents.

2. The control device of claim 1, wherein each of the output content information and the predetermined output content information includes at least one of sound or subtitle.

3. The control device of claim 1, wherein the status information indicates start of simultaneous reproduction of a plurality of contents by the controlled device.

4. The control device of claim 1, wherein the status information indicates mute of output sound of the controlled device.

5. The control device of claim 1, wherein the transition of contents includes a sound switching of the controlled device.

6. The control device of claim 1, wherein the contents includes data of a plurality of sounds.

7. The control device of claim 1, wherein the contents includes a plurality of screen contents.

8. The control device of claim 1, wherein the predetermined output content information is based on whether a default value is set.

9. The control device of claim 1, wherein the predetermined output content information is based on an operation input by a user.

10. The control device of claim 9, wherein the operation input is input through a graphical user interface.

11. The control device of claim 1, wherein the predetermined output content information is a predetermined sound different from a sound of the output content information.

12. A control method comprising:

switching, by a processor, of an output content information of a control device to a predetermined output content information, when a transition of contents of a controlled device is detected based on a result of a determination from status information from the controlled device whether the controlled device is transitioned to a sound switchable status, and when the controlled device is determined to be in the sound switchable status by the processor, determining, by the processor, from the status information, whether the controlled device is determined to be in the sound switchable status directly after the controlled device has transitioned from a state of reproducing single-sound contents to the sound switchable status, in which the result is based on a second determination from the status information whether the controlled device is reproducing multiplex-sound contents, in which the status information indicates a second result of a third determination at the controlled device whether transition of type of contents being reproduced at the controlled device is to the multiplex-sound contents, and is based on analyzing of contents data by circuitry of the controlled device, and in which the controlled device is determined to be in the sound switchable status directly after the controlled device has transitioned from the state of reproducing the single-sound contents to the sound switchable status, when the status information is determined to indicate the controlled device started reproducing the multiplex-sound contents directly after reproducing the single-sound contents.

13. A non-transitory recording medium recorded with a computer readable program executable by a computer, the program comprising:

switching of an output content information of a control device to a predetermined output content information, when a transition of contents of a controlled device is detected based on a result of a determination from status information from the controlled device whether the controlled device is transitioned to a sound switchable status, and when the controlled device is determined to be in the sound switchable status, determining, from the status information, whether the controlled device is determined to be in the sound switchable status directly after the controlled device has transitioned from a state of reproducing single-sound contents to the sound switchable status, in which the result is based on a second determination from the status information whether the controlled device is reproducing multiplex-sound contents, and in which the status information indicates a second result of a third determination at the controlled device whether transition of type of contents being reproduced at the controlled device is to the multiplex-sound contents, and is based on analyzing of contents data by circuitry of the controlled device, in which the controlled device is determined to be in the sound switchable status directly after the controlled device has transitioned from the state of reproducing single-sound contents to the sound switchable status, when the status information is determined to indicate the controlled device started reproducing the multiplex-sound contents directly after reproducing the single-sound contents.

14. A controlled device comprising:

a processing device configured to control:

receiving contents data including at least sound data through an antenna or a network;

receiving an operation signal from a control device or a controlled device remote controller, and performing contents switching in response to a contents switching command;

transmitting at least a part of the contents data to the control device and receiving, from the control device, a sound/subtitle setting value designating a predetermined content to be acquired and transmitted to the control device as output content; and generating status information representing content switching and transmitting the status information to the control device, in which the status information indicates whether the controlled device started reproducing multiplex-content-type contents directly after reproducing single-content-type contents.

15. The controlled device according to claim 14, wherein the processing device is configured to control performing sound/subtitle switching in response to a sound/subtitle switching command.

16. The controlled device according to claim 14, wherein the sound/subtitle setting value indicates main sound, sub sound or mute.

17. The controller device according to claim 14, wherein the multiplex-content-type contents is multiplex-sound contents or multiplex-subtitle contents and the single-content-type contents is single-sound contents or single-subtitle contents.

* * * * *